United States Patent [19]

Frühauf

[11] Patent Number: 4,691,128
[45] Date of Patent: Sep. 1, 1987

[54] CIRCUIT FOR COUPLING A SIGNAL PROCESSING DEVICE TO A TRANSMISSION LINE

[75] Inventor: Waldemar Frühauf, Nuremberg, Fed. Rep. of Germany

[73] Assignee: Siemens Aktiengesellschaft, Berlin and Munich, Fed. Rep. of Germany

[21] Appl. No.: 738,916

[22] Filed: May 29, 1985

[30] Foreign Application Priority Data

May 30, 1984 [DE] Fed. Rep. of Germany ....... 3420268

[51] Int. Cl.$^4$ .................. H03K 17/56; H03K 5/08; H03H 7/38
[52] U.S. Cl. .................. 307/557; 307/241; 333/32
[58] Field of Search .................. 333/32, 124, 443; 307/241–246, 557

[56] References Cited

U.S. PATENT DOCUMENTS

| | | | |
|---|---|---|---|
| 3,585,399 | 6/1971 | Andrews, Jr. | 333/124 |
| 3,656,002 | 4/1972 | Gilson et al. | 307/244 |
| 3,700,832 | 10/1972 | Beurrier | 333/124 |
| 4,535,360 | 8/1985 | Briley et al. | 307/243 |

FOREIGN PATENT DOCUMENTS 0093882 11/1983 European Pat. Off. .
3215063 11/1983 Fed. Rep. of Germany .

*Primary Examiner*—Stanley D. Miller
*Assistant Examiner*—B. P. Davis
*Attorney, Agent, or Firm*—John F. Moran

[57] ABSTRACT

A coupling circuit is disclosed having a series connection of a first transistor (2) and a controlled current source (3). A transmission line (17) is connected to the junction of the first transistor (2) and current source (3). A signal I/O terminal of a signal processing device (1), acting as both input and output, is connected via a first resistor (4) to the base of the first transistor (2). A control output S of the device (1), which presents a signal establishing the transmission direction, is connected via a second resistor (5) to the base of the first transistor (2). The transmission line (17) is connected via a third resistor (6) to the signal I/O terminal of the device (1). This coupling circuit can be used both for transmitting and for receiving signals, the impedance being low in the transmitting direction and high in the receiving direction. The coupling circuit requires only two connections to the signal-processing device, this being advantageous, in particular, when using large scale integrated circuits.

11 Claims, 5 Drawing Figures

CIRCUIT FOR COUPLING A SIGNAL PROCESSING DEVICE TO A TRANSMISSION LINE

BACKGROUND OF THE INVENTION

The invention relates to a circuit for coupling a signal processing device to a signal transmission line. The circuit comprises a series connection of a first transistor and a controlled current source connected to a supply voltage source, the junction of the first transistor and current source being connected to the transmission line. The first transistor is driven by the output signals of the signal processing device and the current source is connected in during each period of transmission of the device.

A coupling circuit of this type is known, for example, from the German patent publication No. OS 32 15 063 (corresponding to European published patent application No. 093,882). The environment of such a circuit may include a transmission system wherein transmission is effected at low impedance in order to match a low impedance transmission path, while the receivers may have high impedance in order to load the transmission path as little as possible. This problem arises, in particular, when the electric power system installed in a building is employed as the transmission path for data. Such systems are utilized, for example, for the selective remote control of electrical devices located in buildings. In this case, encoded information in the form of address or command messages, transmitted as carrier frequency pulses (intermittent sine wave trains) are relayed via the electric power system. Due to the operation of the various electrical power devices, the installed electric power system is subject to strong impedance fluctuations. In order to substantially reduce the variations in the voltage level of the carrier frequency sine wave trains due to such impedance fluctuations, it has been suggested, according to German patent publication No. OS 32 15 063, to provide a coupling circuit which establishes low-impedance coupling for the duration of a command message but which is otherwise switchable with high impedance.

SUMMARY OF THE INVENTION

It is an object of the present invention to provide a coupling circuit of the type described above which is suitable for transmitting as well as for receiving, which keeps the number of circuit components to a minimum and which requires few connections to the signal processing device.

This object, as well as further objects which will become apparent from the discussion that follows, is achieved, according to the invention, by connecting the I/O signal terminal of the signal processing device, acting as both input and output, to the base of a first transistor via a first resistor; by connecting a control output of the signal processing device, which presents a signal representative of the transmission direction, to the base of the first transistor via a second resistor; and by connecting the transmission line to the signal I/O terminal of the device via a third resistor.

The coupling circuit according to the invention is therefore usable both for transmitting and for receiving signals, the terminating impedance being low during transmission and high during reception. Through the use of a single signal terminal which acts both as output for transmitting and as input for receiving, it is necessary to provide only two connections between the signal processing device and the coupling circuit. This is of importance especially when a large scale integrated circuit is used for the signal processing device, as the number of terminals in such a circuit is always limited in proportion to the number of functions realized on a circuit.

The third resistor is arranged advantageously between the junction of the first transistor with the current source and the base of the first transistor. Thus the signal is supplied, for receiving, directly to the signal terminal of the signal processing device via the third and the first resistors.

The current source may consist of the series connection of a second transistor and a fourth resistor, the second transistor having the same conducting direction as the first transistor. The base of the second transistor is connected to the tap of a voltage divider formed by two further resistors, one of which is connected to the control output of the device. On the one hand, this makes the input resistance of the circuit very high in receiving, while on the other hand, in transmitting, the current source can carry a high current.

In an alternative embodiment the current source, which consists of the series connection of the second transistor and a fourth resistor, is arranged in parallel with a fifth resistor, and the base of the second transistor is connected to the signal terminal of the device. In this case, the impedance of the circuit will no longer be high when in the receiving mode. But if the coupling stage is followed by a filter, for example a series resonant circuit, the Q-factor of this resonant circuit will be higher in the receiving mode due to the lower input resistance.

In an especially simple form of realization, the current source may consist of the series connection of a diode with a fourth resistor, with this series connection arranged in parallel with a fifth resistor. The diode can take over high currents against the reference potential and always becomes operative when the control signal has a "one" level.

In an advantageous form of realization, the first transistor is connected to the supply voltage via a sixth resistor, the junction of this resistor with the first transistor being connected to the base of the second transistor through a capacitor. Thus a load-dependent control of the current source is achieved through the capacitor, so that the current consumption is reduced.

The second resistor may be connected in series with a fifth resistor, through which the second resistor is connected to the base of the first transistor, the junction of these two resistors being connected to a reference potential via a capacitor. This capacitor acts as smoothing capacitor for soft insertion of the current source, so that clicking noises are avoided.

In an especially advantageous embodiment, the second resistor is connected in series with a parallel resonant circuit, tuned to the frequency of the signals to be transmitted, through which the second resistor is connected to the base of the first transistor. The junction of the second resistor and parallel resonant circuit are then connected to a reference potential via a third capacitor of high capacitance. The capacitance of the third capacitor must be so high that it almost constitutes a short cirucit at the frequency of the transmitted signals. The parallel resonant circuit then acts as a filter both in the receiving and transmitting modes.

The advantages of the arrangement according to the present invention come into play also when, instead of the transmission line, a I/O device is connected which acts both as a signal transmitter and a signal receiver. In the receiving mode of the connected I/O device the impedance of the coupling circuit is then low, in adaptation to a low impedance of the device, whereas in the transmitting mode its impedance is high so that the generated signals are scarcely loaded.

For a full understanding of the present invention, reference should now be made to the following detailed description of the preferred embodiment of the invention and to the accompanying drawings.

DESCRIPTION OF THE PREFERRED EMBODIMENT

Figure 1:
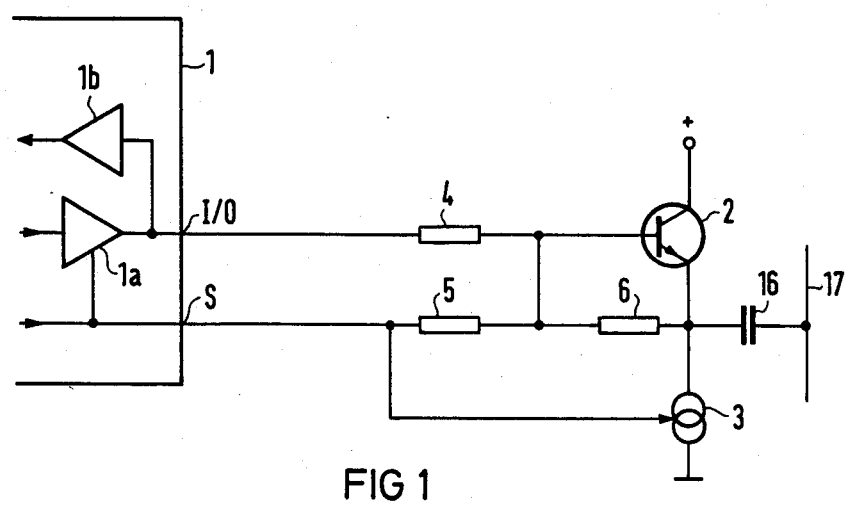
FIG. 1 is a schematic diagram of a coupling circuit according to the present invention.

The preferred embodiments of the present invention will now be described with reference to FIGS. 1-5 of the drawings. Identical elements in the various figures are designated with the same reference numerals.

FIG. 1 shows a basic diagram of the arrangement according to the present invention. In this case the signal processing device 1 is preferably realized as a large scale integrated circuit, which contains, e.g., a modulator and demodulator. A transmitting amplifier 1a is connected on the output side, and a receiving amplifier 1b on the input side, to a signal I/O terminal which serves at the same time as both input and output. At a control terminal S of the device 1 a "one" signal is always present when the device operates in the transmitting mode. The signal processing device 1 is coupled to a transmission line 17—which may be a power line, for example—by means of a coupling circuit. The coupling circuit comprises the series connection of an NPN transistor 2 and a current source 3, the collector of transistor 2 being connected to a positive supply voltage and the current source 3 being connected to a reference potential.

The junction of the transistor 2 and current source 3 is connected via a capacitor 16 to the transmission line 17. The base of the transistor 2 is actuated by the signal I/O terminal of the device 1 via a resistor 4. The controllable current source 3 is actuated directly via the control terminal S of device 1.

Further, the signal terminal S of device 1 is connected via a resistor 5 to the base of the transistor 2, and a resistor 6 is connected between the base and emitter of the transistor 2. In the receiving mode, a "zero" signal is present at the control output S of the device 1, so that the current source 3 as well as the transistor 2 are blocked. Therefore, the input impedance of the coupling circuit is high. Signals present on the transmission line 17 are supplied via the capacitor 16, resistor 6 and resistor 4 to the signal terminal I/O of device 1 and are processed therein.

Now if the device 1 switches to the transmitting mode, a "one" signal appears at the control terminal S which turns on the current source 3 and provides, via resistor 5, an operating point for the transistor 2. The transmission signals present at the signal I/O terminal control the transistor 2 via resistor 4 due to the bias furnished by the signal terminal, so that the transmitted signals are coupled in on the transmission line 17 with low impedance. Therefore, even in the case where a power supply line is subject to strong impedance fluctuations, the voltage level of the signal carrying the coded information remains largely unaffected. On the other hand, the signals present on the transmission path 17 are almost unattenuated by the coupling circuits which are of high impedance in the receiving state.

Figure 2:
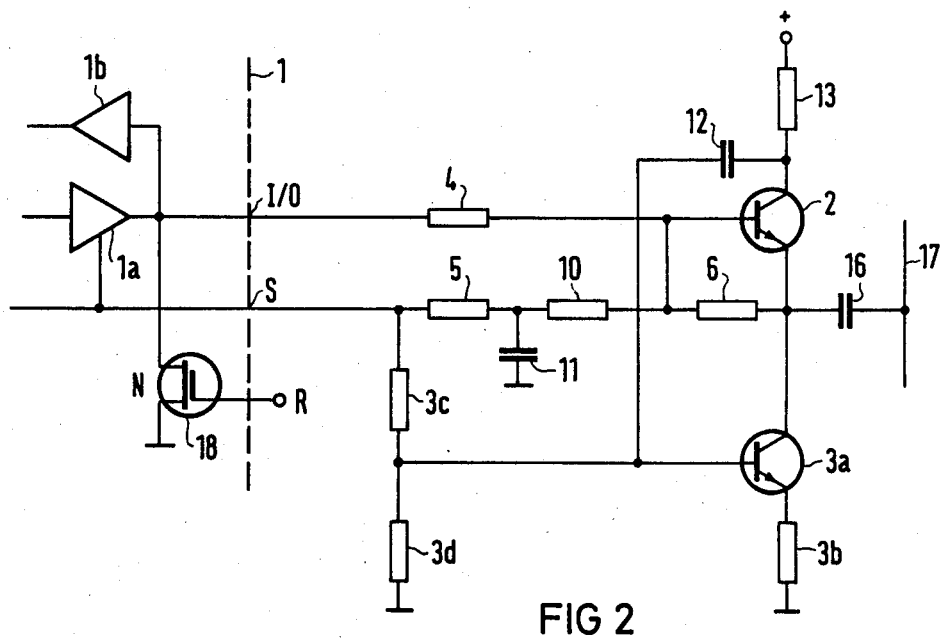
FIG. 2 is a schematic diagram of the first preferred embodiment of the coupling circuit according to the invention.

A detailed embodiment is illustrated in FIG. 2. Here the controllable current source 3 is realized by the series connection of an NPN transistor 3a and a resistor 3b connected to its emitter. Transistor 3a has the same conductivity type and the same conducting direction as transistor 2. The base of transistor 3a is connected to the tap of a voltage divider consisting of the resistors 3c and 3d. This voltage divider is connected on the one hand to the control terminal S of device 1 and to the reference potential on the other. Thus transistor 3a takes over a current established by the resistors 3b and 3d and by the voltage level of the signal at the control terminal S, when a "one" signal is present at the control terminal S. However, in addition, the base of the transistor 3a is connected via a capacitor 12 to the collector of the transistor 2. This collector is connected via a resistor 13 to the positive pole of the supply voltage. This circuit has the advantage that the no-signal current of transistor 3a can be kept low although high load currents are nevertheless possible even against the reference potential. In fact, the transistor 3a is controlled in a load-dependent manner via the capacitor 12.

In addition to the circuit elements shown in FIG. 1, the circuit of FIG. 2 comprises a resistor 10, which is connected in series with the resistor 5 and connects the latter with the base of transistor 2 and with the resistor 6. The junction of the resistors 5 and 10 is grounded through a capacitor 11. With the R-C element thereby forming of resistor 5 and capacitor 11, the flanks of the signal are flattened at the terminal S and clicking noises are thereby avoided.

In the circuit according to FIG. 2, the signal I/O terminal of the signal processing device 1 is connected to a reference potential inside the device 1 via a field effect transistor 18. The base of the field effect transistor 18 is connected to a regulating terminal R. The amplitude at the signal I/O terminal of device 1 can thus be regulated through this terminal R. This arrangement can be realized to special advantage in integrated CMOS circuits.

Figure 3:
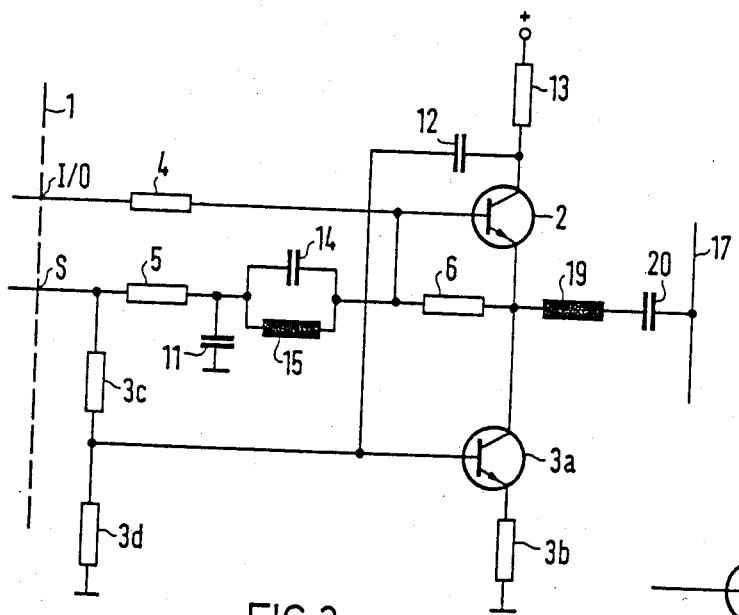
FIG. 3 is a schematic diagram of the second preferred embodiment of the coupling circuit according to the invention.

Another embodiment of the present invention is illustrated in FIG. 3. Here, the resistor 10 of FIG. 2 is replaced by a parallel resonant circuit with a capacitor 14 and an inductor 15. Furthermore, the transmission line 17 is connected via a series resonant circuit with an inductor 19 and a capacitor 20 to the junction of the transistors 2 and 3a. In this circuit the capacitance of capacitor 11 must be sufficiently large that the latter acts almost as a short circuit in the frequency range of the signals. The parallel resonant circuit 14, 15 together with capacitor 11 then brings about, on the receiving path as well as on the transmitting path, a strong attenuation for all frequencies which do not correspond to the desired frequency. These frequencies are attenuated additionally by the series resonant circuit 19, 20, which is also activated both in the transmitting as well as in the receiving direction. The two resonant circuits therefore constitute two filters, which are utilized in both signal directions. Hence equalization is necessary only in one mode of operation, the easiest being in the transmitting mode.

Figure 5:
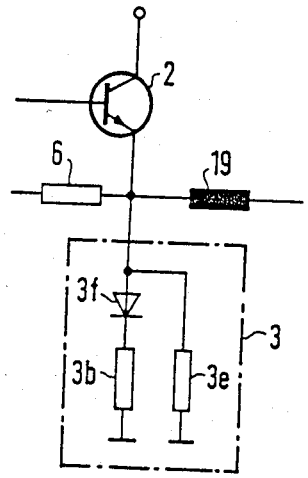
FIG. 5 is a schematic diagram showing an alternative current source for the embodiment of FIG. 4.
Figure 4:
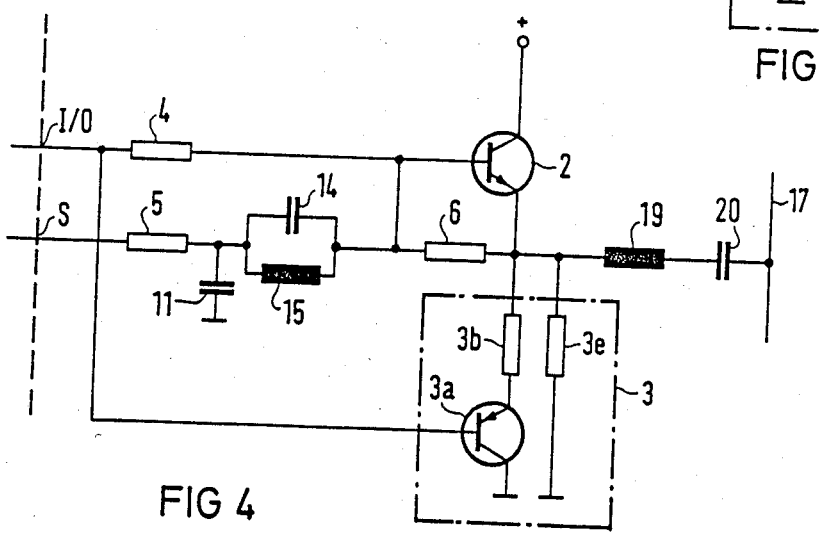
FIG. 4 is a schematic diagram of the third preferred embodiment of the coupling circuit according to the invention.

FIGS. 4 and 5 illustrate two additional possible realizations for the current source 3. In the embodiment according to FIG. 4, a PNP transistor 3a is used instead of an NPN transistor. The emitter of this transistor is connected via a resistor 3b with the emitter of transistor 2 and its collector is connected with the reference potential. The base of transistor 3a is thereby controlled, not by the control signal, but through the signal I/O terminal. Thus, with negative signals at the signal I/O terminal the transistor 3a is switched on so that the circuit is able to supply high negative currents against the reference potential.

Since, therefore, transistor 3a is switched on only when it is needed, this circuit saves current. Positive currents are supplied via transistor 2, as in the other circuits. Because of the parallel connection of the resistor 3e, the impedance of the circuit in the receiving mode will no longer be high. Instead, however, the series resonant circuit 19, 20 will have a higher Q-factor due to this lower impedance. In addition, with the resistor 3e capacitive voltages are prevented from being coupled in via the capacitor 20—i.e., through the high impedance input—in the receiving mode of the coupling circuit, thus leading to inadmissable input voltages. This is especially important when the transmission line 17 is part of a power supply system.

The circuit according to FIG. 5 differs from that of FIG. 4 in that the transistor 3a is replaced by a diode 3f, the anode of which is connected with the emitter of the transistor 2. This diode 3f and the series-connected resistor 3b make it possible to pass high currents against the reference potential. Diode 3f is always conducting as long as a "one" signal is present at the signal output S. As in the circuit according to FIG. 4, the Q-factor of the series resonant circuit 19, 20 is improved by the parallel-connected resistor 3e.

For all circuits shown it should be pointed out that resistors directly connected with the signal processing device 1 need not be present as discrete components, but may possibly be formed by the internal resistance of the respective outputs of the device 1.

With the described coupling circuit, devices other than the transmission line, which act both as transmitters and as receivers, can be coupled to the signal-processing device. In these cases, it will often be desirable to supply the connected device with low impedance, when this device serves as a receiver. Conversely, when the connected device is operating as a transmitter, it should be loaded as little as possible; that is, it should be connected to a high impedance. This is precisely what is achieved with the described coupling circuit. An example device of this type which can act both as a transmitter and a receiver is a loudspeaker which can also act as microphone.

There has thus been shown and described a novel circuit for coupling for a signal-processing device to a transmission line which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. A coupling circuit for coupling a signal processing device to an I/O device, such as a transmission line subject to substantial impedance fluctuations, the signal processing device having an I/O terminal for receiving and producing both input and output signals, respectively, and a control output for producing a control output signal having two states indicative of the direction of transmission, said coupling circuit comprising:
   (a) a first transistor having a base, an emitter, and a collector wherein the latter-two form an emitter-collector circuit;
   (b) a controlled current source and a supply source connected in series with the emitter-collector circuit of said first transistor, said first transistor and said current source connected together at a junction coupled to the I/O device;
   (c) a first resistor coupling the I/O terminal of the signal processing device to the base of said first transistor;
   (d) a second resistor coupling the control output of the signal processing device to the base of said first transistor;
   (e) a third resistor coupling the I/O terminal of the signal processing device to the I/O device via the first resistor and
   (f) said first transistor and said controlled current source being responsive to the states of the control output signal, said first transistor and said controlled current source both conducting responsive to a first state of said control output signal to provide a first impedance value for an output signal transmitted from the I/O terminal to the I/O device, said first transistor and said controlled current source both non-conducting responsive to a second state of said control output signal to provide a second impedance value for an input signal transmitted from the I/O device to the I/O terminal, and the second impedance value being greater than the first impedance value to increase responsiveness of the signal processing device during reception while the lower first impedance value increases the output signal drive to the I/O device during transmission.

2. The coupling circuit according to claim 1, wherein said third resistor is arranged between the junction of said first transistor with said current source and the base of said first transistor.

3. The coupling circuit according to claim 1, wherein said control output of the signal processing device is coupled to a control input of said current source.

4. The coupling circuit according to claim 3, wherein said current source comprises a series connection of a fourth resistor and a second transistor having a base and an emitter-collector path, wherein the second transistor has the same conducting direction as the first transistor, and wherein a center tap of a voltage divider formed of two resistors is coupled to the base of the second transistor, one resistor of the voltage divider is coupled to the control output of the signal processing device.

5. The coupling circuit according to claim 1, wherein the current source comprises a series connection of a second transistor and a fourth resistor, this series connection being connected in parallel with a fifth resistor, and wherein a base of said second transistor is connected to the I/O terminal of the signal processing device.

6. The coupling circuit according to claim 1, wherein said current source comprises a series connection of a diode and a fourth resistor, this series connection being connected in parallel with a fifth resistor.

7. The coupling circuit according to claim 4, wherein said first transistor is connected via a sixth resistor to a supply voltage, and wherein a junction of said sixth resistor with said first transistor is connected via a first capacitor to a base of said second transistor.

8. The coupling circuit according to claim 1, wherein said second resistor is connected in series with a seventh resistor through which said second resistor is connected to the base of said first transistor, and wherein a junction of these second and seventh resistors is connected to a reference potential via a second capacitor.

9. The coupling circuit according to claim 1, wherein said second resistor is connected in series with a parallel resonant circuit tuned to the frequency of the signals to be transmitted and through which the second resistor is connected to the base of said first transistor, and wherein a junction of the second resistor and said parallel resonant circuit is connected to a reference potential via a third capacitor of high capacitance.

10. The coupling circuit according to claim 1, wherein said I/O device acts both as a signal transmitter and a signal receiver.

11. The coupling circuit according to claim 10, wherein said I/O device is a transmission line for transmitting data and is an electrical power distribution system for powering electrical devices.

* * * * *